Nov. 4, 1941.  C. T. JONES  2,261,384
COLLAPSIBLE TRANSPLANTING BOX
Filed Sept. 26, 1940
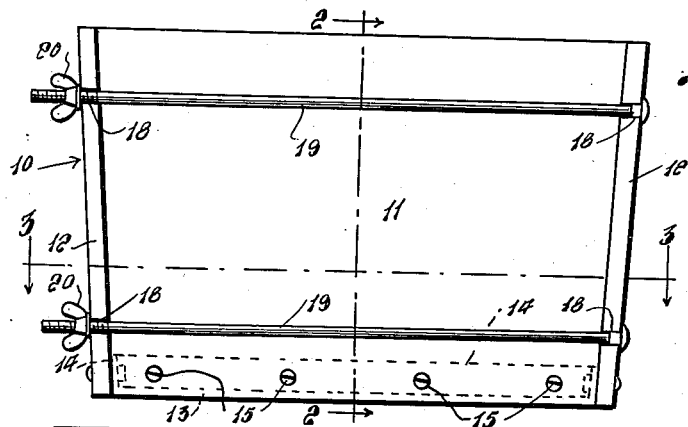
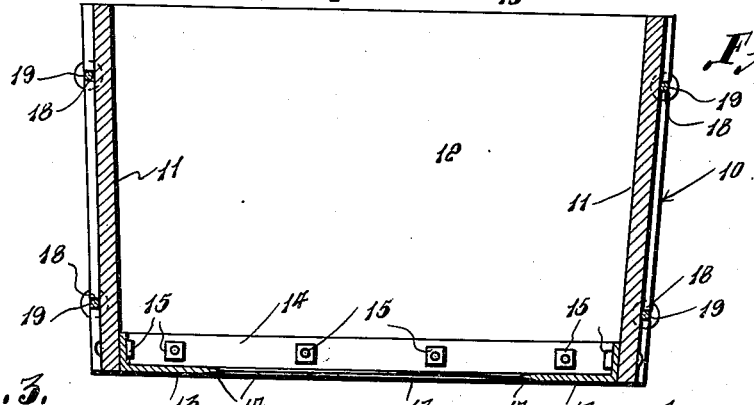
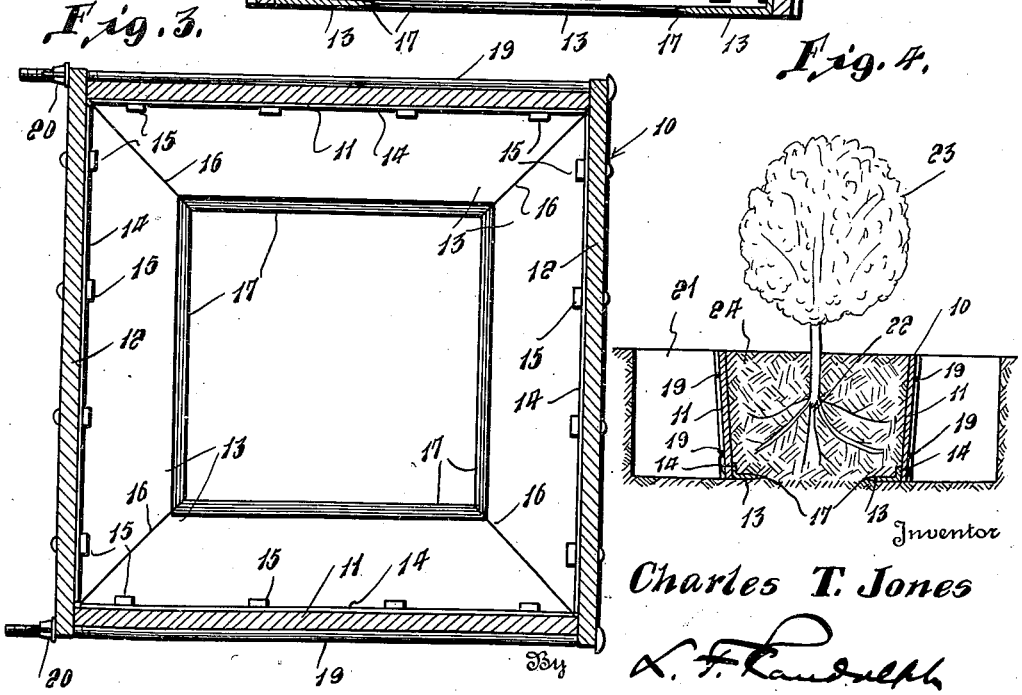
Inventor
Charles T. Jones
Attorney Patented Nov. 4, 1941

2,261,384

UNITED STATES PATENT OFFICE 2,261,384

COLLAPSIBLE TRANSPLANTING BOX

Charles T. Jones, Huntington Park, Calif.

Application September 26, 1940, Serial No. 358,535

2 Claims. (Cl. 47—37)

This invention relates to a novel device for use in holding the roots of a tree and the soil disposed therearound for transplanting the tree without removing the roots from their original soil.

It is a primary aim of the invention to provide a device which may be readily attached around the roots of a tree and around the soil, which is adjacent the roots, for transplanting the tree without disturbing the roots and for providing a device which may be readily attached to the roots, prior to removing the tree from its original location, and which may be readily detached therefrom after the tree has been set up in its new location.

More particularly, it is an aim of the invention to provide a device having four side walls provided at their lower edges with inwardly projecting blades adapted to penetrate the earth beneath the roots of a tree, and means for detachably connecting the sides to form a box or receptacle for holding the roots and the soil disposed therearound while the tree is being moved and replanted.

Other objects and advantages of the invention will hereinafter become more fully apparent from the following description of the drawing, which illustrates a preferred embodiment thereof, and wherein:

Figure 1 is a side elevational view of the transplanting box,

Figure 2 is a vertical sectional view taken substantially along the plane of the line 2—2 of Figure 1, Figure 3 is a horizontal sectional view taken substantially along the plane of the line 3—3 of Figure 1, and Figure 4 is a view similar to Figure 2 showing the box applied to the roots of a tree and containing the soil disposed therearound.

Referring more particularly to the drawing, wherein like reference characters designate like or corresponding parts throughout the different views, 10 designates generally the collapsible tree transplanting box comprising a pair of corresponding sides 11 and a pair of corresponding sides 12. The sides 11 and 12 are provided with corresponding blades 13 having upset flanges 14 at their elongated, back edges which are attached to the inner sides of the sides 11 and 12 by means of nut and bolt fastenings 15. The blades 13 extend inwardly of the sides 11 and 12, adjacent their lower edges, and are provided with tapered ends 16 which are cut at forty-five degree angles to the flanges 14 and to the sides 11 or 12 to which they are attached. The inner edges 17 of the blades 13 are sharpened.

As best seen in Figure 3, the sides 12 are longer than the sides 11 so that their ends extend beyond the sides 11 when the sides 11 and 12 are assembled, as seen in Figure 3, and the extended ends of the sides 12 are provided with correspondingly disposed notches 18 for receiving bolts 19. The threaded shank ends of the bolts 19 are provided with wing nuts 20 which are adapted to be tightened for clamping the sides 11 and 12 together to form a substantially rectangular box 10. The ends 16 of the blades 13 are tapered at forty-five degree angles to the sides to which the blades are attached, so that when the box is assembled the contiguous ends 16 will be in abutting engagement to cause the four blades 13 to form a rectangular bottom portion having a central rectangular opening defined by the four sharpened edges 17.

To apply the box 10 to the roots of a tree to be transplanted, a rectangular trench 21 is first dug around the roots 22 of a tree 23 which is to be transplanted. The dismantled sides 11 and 12 are then applied through the trench 21 to positions around the roots 22 by pressing the blades 13 into the soil 24, which surrounds the roots 22, beneath the roots. The sharpened edges 17 of the blades 13 will readily penetrate the soil 24 so that the sides 11 and 12 may be moved into the positions, as illustrated in Figure 4. The bolts and nuts 19 and 20, respectively, are then applied and the nuts 20 tightened sufficiently to clamp the sides 11 and 12 together around the roots 22 and the soil 24. The tree 23 can then be moved to its new location with the box 10 applied for holding the roots 22 and soil 24. In its new location, the tree should be set up in a hole substantially the size of the outer portion of the trench 21 and in the center thereof. The bolts and nuts 19 and 20 can then be removed releasing the sides 11 and 12 which can then be removed after which the unfilled portion of the hole, not shown, can be filled. It will thus be seen that the tree 23 can be transplanted without disturbing its roots 22 or the soil in which the roots are contained, and that the box 10 can be readily applied to or removed from the roots 22 without disturbing them. The box 10 may obviously be constructed of any suitable material and in various sizes to accommodate trees having root formations of different sizes.

Various modifications and changes are contemplated and may obviously be resorted to as only a preferred embodiment of the invention has been disclosed.

I claim as my invention:

1. A tree transplanting box comprising a box formed of pairs of detachable sides, said sides each being provided with a blade projecting inwardly from its lower edge, one of the pairs of sides being elongated to project beyond the other pair of sides of the box, said projected ends being provided with correspondingly disposed notches, bolts extending through corresponding notches of said pair of sides, and nuts carried by the bolts for clamping the pairs of sides together.

2. A transplanting box as in claim 1, said blades being sharpened at their inner edges for penetrating the soil beneath a tree to be transplanted, and the ends of said blades being tapered at forty-five degree angles and being disposed in abutting engagement when said sides are connected.

CHARLES T. JONES.